United States Patent
Mehta et al.

(10) Patent No.: US 11,870,757 B1
(45) Date of Patent: Jan. 9, 2024

(54) PROTECTING CUSTOMER PERSONAL INFORMATION IN APPLICATION PIPELINE

(71) Applicant: Wells Fargo Bank, N.A., San Francisco, CA (US)

(72) Inventors: Chintan Mehta, San Ramon, CA (US); Michelle Moore, Mooresville, NC (US); Ramakrishna Swarup Pogalur, San Ramon, CA (US); Kunal Jha, Indian Land, SC (US); Kapil Soni, Bangalore (IN); Venkatesan Chinnaraju, Fremont, CA (US); Upul D. Hanwella, San Francisco, CA (US); Ranganathan Kanchi, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/457,384

(22) Filed: Dec. 2, 2021

Related U.S. Application Data

(60) Provisional application No. 63/174,839, filed on Apr. 14, 2021.

(51) Int. Cl.
*H04L 9/40* (2022.01)
*H04L 9/32* (2006.01)

(52) U.S. Cl.
CPC ........ *H04L 63/0407* (2013.01); *H04L 9/3213* (2013.01)

(58) Field of Classification Search
USPC .......................................... 726/26
See application file for complete search history.

(56) References Cited

U.S. PATENT DOCUMENTS 10,043,035 B2  8/2018  LaFever et al.
10,169,315 B1  1/2019  Heckel et al.
(Continued)

FOREIGN PATENT DOCUMENTS

WO   2019086553 A1   5/2019

OTHER PUBLICATIONS

Response to Office Action dated Aug. 17, 2022 from U.S. Appl. No. 16/874,385, filed Nov. 16, 2022, 10 pp.
(Continued)

*Primary Examiner* — Sanchit K Sarker
(74) *Attorney, Agent, or Firm* — Shumaker & Sieffert, P.A.

(57) ABSTRACT

Techniques are described that include detecting customer personal information within any appropriate set of data, such as customer communications produced by customer-facing services offered by an organization. Once detected, the customer personal information may be tokenized within the customer communications, making the data appropriate for external systems, such as cloud-hosted applications. The disclosed techniques include a masking service that may be plugged into an on-premises pipeline of any customer-facing service that makes requests to an off-premises, cloud-hosted application. The masking service may apply rule-based detection and/or machine learning-based detection to detect both structured and unstructured customer personal information included in customer communications. The masking service may further tokenize or otherwise obfuscate or replace the detected customer personal information. The tokenized customer communications may then be included in the requests to the cloud-hosted application or otherwise transmitted to external systems without exposing the customer personal information.

18 Claims, 4 Drawing Sheets

(56) References Cited

U.S. PATENT DOCUMENTS

| | | | |
|---|---|---|---|
| 10,380,380 B1* | 8/2019 | Abdi Taghi Abad | ............... G06F 16/907 |
| 10,878,181 B2 | 12/2020 | Heckel et al. | |
| 11,144,331 B1 | 10/2021 | Kushner et al. | |
| 11,386,259 B2 | 7/2022 | Heckel et al. | |
| 11,431,493 B1* | 8/2022 | Lewi | ............... H04L 9/0866 |
| 2006/0075228 A1 | 4/2006 | Black et al. | |
| 2012/0150773 A1 | 6/2012 | DiCorpo et al. | |
| 2012/0166272 A1* | 6/2012 | Wiley | ............... G06Q 30/0246 705/14.45 |
| 2012/0303558 A1 | 11/2012 | Jaiswal | |
| 2013/0332194 A1 | 12/2013 | D'Auria et al. | |
| 2014/0195429 A1* | 7/2014 | Paulsen | ............... G06Q 20/382 705/44 |
| 2018/0005626 A1 | 1/2018 | Betley et al. | |
| 2018/0285599 A1 | 10/2018 | Praveen et al. | |
| 2019/0163928 A1 | 5/2019 | Hankeln et al. | |
| 2019/0332658 A1* | 10/2019 | Heckel | ............... G06N 3/08 |
| 2019/0377900 A1 | 12/2019 | Balzer et al. | |
| 2020/0081978 A1 | 3/2020 | Ahmed et al. | |
| 2020/0082214 A1 | 3/2020 | Salammagari et al. | |
| 2020/0143053 A1* | 5/2020 | Gutierrez | ............... G06F 21/554 |
| 2020/0342032 A1 | 10/2020 | Subramaniam et al. | |
| 2020/0349271 A1 | 11/2020 | Binkley et al. | |
| 2021/0056099 A1 | 2/2021 | Goodsitt et al. | |
| 2021/0065053 A1 | 3/2021 | Higgins et al. | |
| 2021/0224415 A1* | 7/2021 | Qi | ............... G06F 40/279 |
| 2021/0303724 A1 | 9/2021 | Goshen et al. | |

OTHER PUBLICATIONS

Office Action from U.S. Appl. No. 16/874,385 dated Aug. 17, 2022, 16 pp.

Aberdeen et al., "The Mitre Identification Scrubber Toolkit: Design, training, and assessment," International Journal of Medical Informatics, Sep. 10, 2010, Elsevier, 11 pp.

Gershgorn, "Artificial intelligence can scour code to find accidentally public passwords," Quartz, Apr. 18, 2018, 3 pp.

Meldau, "Deep Neural Networks for Inverse De-Identification of Medical Case Narratives in Reports of Suspected Adverse Drug Reactions," Degree Project in Computer Science and Engineering, Second Cycle, KTH Royal Institute of Technology, Feb. 24, 2018, 114 pp.

U.S. Appl. No. 16/874,385, filed May 14, 2020, Inventor Arnab Dan.

Advisory Action from U.S. Appl. No. 16/874,385 dated Apr. 14, 2023, 3 pp.

Final Office Action from U.S. Appl. No. 16/874,385 dated Feb. 6, 2023, 23 pp.

Response to Final Office Action dated Feb. 6, 2023 from U.S. Appl. No. 16/874,385, filed Apr. 6, 2023, 11 pp.

Notice of Allowance from U.S. Appl. No. 16/874,385 dated May 25, 2023, 9 pp.

* cited by examiner

US 11,870,757 B1

PROTECTING CUSTOMER PERSONAL INFORMATION IN APPLICATION PIPELINE

This application claims the benefit of U.S. Provisional Patent Application No. 63/174,839, filed Apr. 14, 2021, the entire contents of which is incorporated herein by reference.

TECHNICAL FIELD

This disclosure relates to text processing, and more specifically, to processing of text to detect and tokenize sensitive data.

BACKGROUND

Organizations that handle customer personal information, e.g., financial institutions and/or medical institutions, need to protect customer personal information to ensure privacy and security for their customers. Customer personal information may originate to an organization through several sources, such as external customer-facing applications, call center transcripts, chatbot transcripts, emails, and other communications. Such customer personal information may include personally identifiable information (PII) about customers, e.g., phone numbers, addresses, social security numbers, account numbers, names, locations, and the like.

Many organizations have integrated their applications and services with Software-as-a-Service (SAAS) providers that host the organization's applications and services on a cloud platform external to the organization. SAAS providers manage the hardware needed to support the organization's applications and services, and also manage software upgrades to the organization's applications and services. SAAS providers also improve scalability and high availability to ensure the organization's applications and services are available to their customers when requested.

SUMMARY

This disclosure describes techniques that include detecting customer personal information within any appropriate set of data, such as customer communications produced by customer-facing services offered by a business or organization. Once detected, the customer personal information may be tokenized within the customer communications, making the data appropriate for external systems, such as cloud-hosted applications, third-party systems, and off-premises storage repositories. As one example, techniques disclosed herein include a masking service that may be plugged into an on-premises pipeline of any customer-facing service that makes requests to an off-premises, cloud-hosted application. The masking service may apply one or more detection layers, e.g., rule-based detection and/or machine learning-based detection, to detect different types of customer personal information included in customer communications. The masking service may further tokenize or otherwise obfuscate or replace instances of the detected customer personal information. The tokenized customer communications may then be included in the requests to the cloud-hosted application or otherwise transmitted to external systems without exposing the customer personal information.

In one example, the disclosure is directed to a method comprising receiving, by a computing system, text data containing customer personal information, wherein the customer personal information originates from a customer-facing service associated with an externally-hosted application that is external to the computing system; detecting, by the computing system, the customer personal information in the text data using one or more detection layers, each detection layer of the one or more detection layers configured to detect a different type of customer personal information; generating, by the computing system, tokenized data based on output of the one or more detection layers, wherein generating the tokenized data comprises replacing each instance of the customer personal information detected in the text data with a respective token; and sending, by the computing system, a request including the tokenized data to the externally-hosted application.

In another example, the disclosure is directed to a system comprising a customer-facing service associated with an externally-hosted application that is external to the system; and an application pipeline of the customer-facing service that makes requests to the externally-hosted application on behalf of the customer-facing service, the application pipeline comprising a computing system that includes a memory and processing circuitry in communication with the memory. The processing circuitry is configured to receive text data containing customer personal information, wherein the customer personal information originates from the customer-facing service; detect the customer personal information in the text data using one or more detection layers, each detection layer of the one or more detection layers configured to detect a different type of customer personal information; generate tokenized data based on output of the one or more detection layers, wherein to generate the tokenized data, the processing circuitry is configured to replace each instance of the customer personal information detected in the text data with a respective token; and send a request including the tokenized data to the externally-hosted application.

In a further example, this disclosure is directed to a computer-readable medium storing instructions that, when executed, cause processing circuitry of a computing system to receive text data containing customer personal information, wherein the customer personal information originates from a customer-facing service associated with an externally-hosted application that is external to the computing system; detect the customer personal information in the text data using one or more detection layers, each detection layer of the one or more detection layers configured to detect a different type of customer personal information; generate tokenized data based on output of the one or more detection layers, wherein to generate the tokenized data, the instructions cause the processing circuitry to replace each instance of the customer personal information detected in the text data with a respective token; and send a request including the tokenized data to the externally-hosted application.

The details of one or more examples of the disclosure are set forth in the accompanying drawings and the description herein. Other features, objects, and advantages of the disclosure will be apparent from the description and drawings, and from the claims.

DETAILED DESCRIPTION

Figure 1:
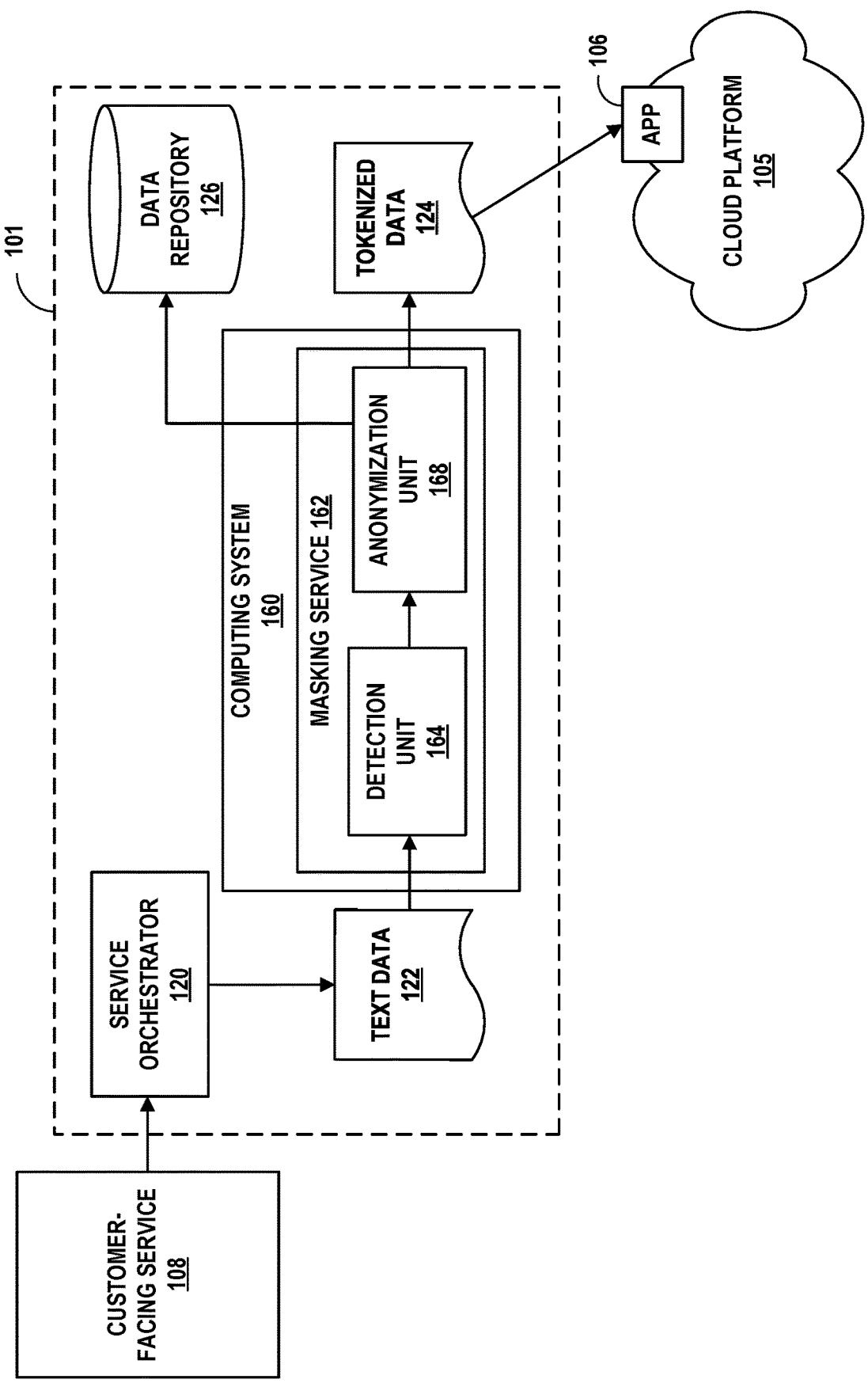
FIG. 1 is a block diagram illustrating an example cloud-hosted application pipeline including a computing system configured to protect customer personal information prior to inclusion in requests sent to the cloud-hosted application on a cloud platform, in accordance with one or more aspects of the present disclosure.

FIG. 1 is a block diagram illustrating an example cloud-hosted application pipeline 101 including a computing system 160 configured to protect customer personal information prior to inclusion in requests sent to the cloud-hosted application 106 on a cloud platform 105, in accordance with one or more aspects of the present disclosure. As shown in the illustrated example, an organization's customer-facing applications and services (e.g., application 106) may be hosted on cloud platform 105 and integrated with Software-as-a-Service (SAAS) providers. In some cases, the organization may need to protect customer personal information by tokenizing or removing personally identifiable information (PII) from requests sent from a customer-facing service 108 to a cloud-hosted application 106 or other off-premises system or repository. In this disclosure, the terms customer personal information, personally identifiable information or PII, and sensitive data are used interchangeably.

The techniques disclosed herein include a masking service 162 that may be plugged into on-premises pipeline 101 of any customer-facing service 108 that makes requests to application 106 hosted on off-premises cloud platform 105 or otherwise sends data to off-premises systems or repositories. The example of FIG. 1 illustrates on-premises pipeline 101 that includes a service orchestrator 120 to receive customer communications from customer-facing service 108, such as external customer facing applications, call centers, chat transcription services, etc., associated with cloud-hosted application 106. Service orchestrator 120 may pre-process the customer communications received from customer-facing service 108 to prepare the customer communications for processing by masking service 162 and/or other services within on-premises pipeline 101. As one example, the customer communications may comprise text or audio communications including transaction requests, complaints, questions, or the like. In this example, service orchestrator 120 may transcribe audio communications using natural language processing (NLP) or other means to convert the audio to text, and may otherwise re-format the customer communications into an appropriate format for masking service 162. Service orchestrator 120 outputs the pre-processed customer communications in the form of text data 122.

Computing system 160 may comprise one or more computing devices or processing circuitry configured to support masking service 162. Masking service 162 includes a detection unit 164 and an anonymization unit 168. Detection unit 164 may comprise one or more PII detection layers where each detection layer is configured to automatically detect a different type of customer personal information (e.g., structured and/or unstructured) included within text data 122. Detection unit 164 may comprise a balanced mix of rule-based as well as machine learning-based data detection layers. For example, a rule-based detection layer may include regular expression (RegEx) detection that is capable of detecting PII elements that have a deterministic pattern (e.g., emails, account numbers, social security numbers, phone numbers, zip codes, etc.). A machine learning-based detection layer may include one or more machine learning models trained to detect unstructured PII elements such as named entities (e.g., person names, organizations, geopolitical locations, etc.). Additional details on identifying sensitive information in structured and unstructured text may be found in U.S. patent application Ser. No. 16/874,385, filed May 14, 2020, the entire contents of which is incorporated herein by reference.

Anonymization unit 168 may apply one or more algorithms to the output of the one or more detection layers within detection unit 164 to tokenize, mask, or otherwise anonymize the detected PII elements within text data 122. For example, anonymization 168 may be configured to tokenize the structured PII elements detected by a rule-based detection layer of detection unit 164 by replacing the actual data in text data 122 with strings of symbols tokens. Anonymization unit 168 may further be configured to replace unstructured PII elements detected by a machine learning-based detection layer of detection unit 164 by replacing the named entities within text data 122 with fixed name tokens. In some scenarios, anonymization unit 168 may further perform encryption of the tokenized data. Anonymization unit 168 outputs the tokenized, and in some cases encrypted, customer communication as tokenized data 124.

In some examples, anonymization unit 168 may cache or otherwise store text data 122 and associated signaling information in data repository 126 or another on-premises cache or other storage location. Anonymization unit 168 may generate the signaling information for tokenized data 124 to enable faithful recovery of the original customer communication of text data 122 from tokenized data 124. As illustrated in FIG. 1, tokenized data 124 may be included in a request to cloud-hosted application 106 for customer-facing service 108 or otherwise transmitted to off-premises systems or repositories. Masking service 162, as described herein, provides a machine learning- and rule-based flexible strategy that protects both structured PII elements and unstructured PII elements within customer communications that may be passed to external applications to fulfill customer service needs.

In some examples, computing system 160 may receive a response to the request from cloud-hosted application 106 that includes one or more tokens from tokenized data 124. Anonymization unit 168 of masking service 162 may recover at least a portion of the customer personal information from the one or more tokens included in the response based on text data 122 and the signaling information cached in data repository 126. Based on the response from cloud-hosted application 106 and the at least partially recovered customer personal information, computing device 160 may send an appropriate response back to customer-facing service 108 via service orchestrator 120.

Figure 2:
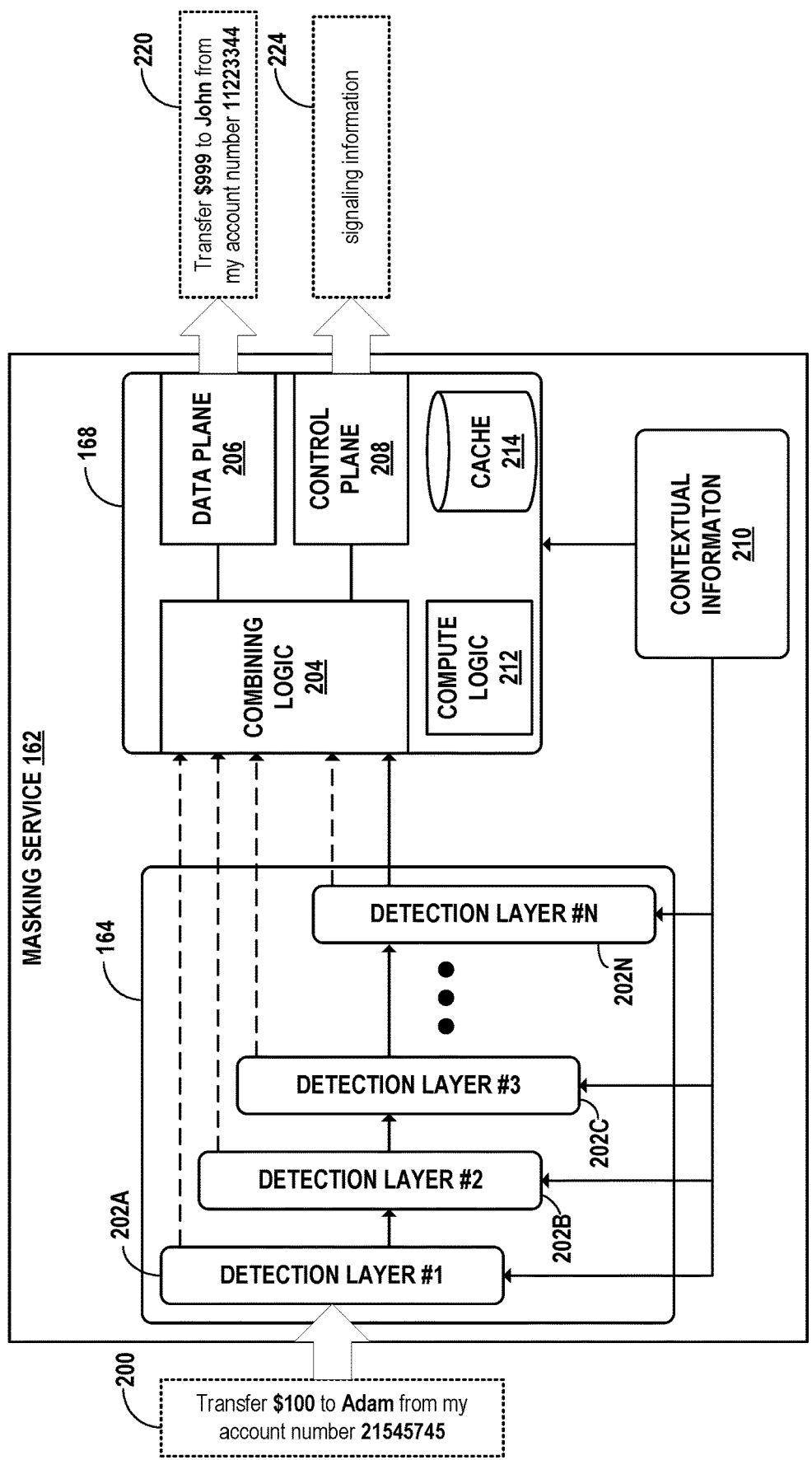
FIG. 2 is a conceptual diagram illustrating an example data flow through a masking service configured to detect and anonymize customer personal information in text data, in accordance with one or more aspects of the present disclosure.

FIG. 2 is a conceptual diagram illustrating an example data flow through masking service 162 of FIG. 1 configured to detect and anonymize customer personal information in text data, in accordance with one or more aspects of the present disclosure.

In the example of FIG. 2, masking service 162 includes detection unit 164 with a set of detection layers 202A-202N (collectively, "detection layers 202") where each of detection layers 202 may be configured to identify specific types or forms of customer personal information or sensitive data within text data, e.g., text data 200. For example, in the example of FIG. 2, detection layer #1 202A is a rule-based detection layer that applies rules to identify, within text data 200, each instance of structured sensitive data. Detection layer #1 202A may employ regular expression ("regex") parsing techniques to identify sensitive data having deterministic patterns with consistent and/or regular forms. The structured sensitive data may correspond to account numbers, social security numbers, email addresses, telephone numbers, zip codes, and the like, that have regular or known formats. This type of structured sensitive data may be identified reliably using a rule-based parser or a regular expression-based search algorithm or parser.

Detection layer #2 202B in the example of FIG. 2 is a rule-based detection layer that takes heuristics into account to identify specific types of sensitive data within text data 200. Detection layer #2 202B may apply custom rules to identify sensitive data having a format or pattern that has been learned over time and/or is specific to an organization or an application for which masking service 162 is being applied. For example, detection layer #2 202B may be configured to identify sensitive data comprising a string of consecutive numbers with a certain length, such as monetary values that do not conform to a standard format, account numbers having an unknown format, or portions of numbers that have regular or known formats (e.g., a portion of a social security number). In this example, the sensitive data detected by detection layer #2 202B may include certain numbers that escape detection by detection layer #1 202A.

Detection layer #3 202C in the example of FIG. 2 is a machine learning-based detection layer that may also apply some rules to identify unstructured sensitive data within text data 200. Detection layer #3 202C may apply natural language processing (NLP) and one or more machine learning models trained to identify instances of unstructured sensitive data using the context of a line or sentence within text data 200. The unstructured sensitive data can take many forms, such as names of people, organizations, locations, and other proper nouns. In some examples, unstructured sensitive data may further include street addresses. Each of these instances of unstructured sensitive data typically lack a consistent or regular pattern, and a rules-based parser with or without heuristics would often have difficulty reliably identifying each such instance of unstructured sensitive data.

A machine learning model, however, may be effectively trained to identify instances of unstructured sensitive data. To train such a model, computing system 160 (or another computing system) may collect a sufficiently large number of transcripts, and label each instance of unstructured sensitive data that occurs within each transcript. Computing system 160 (or another computing system) may train a machine learning model to use NLP and/or probabilistic parsing techniques to make accurate predictions about the structure of messy, unstructured text.

In some examples, detection layer #3 202C may employ Conditional Random Field modeling techniques to take context into account, which may involve a machine learning model that uses other words in the same line or within the same sentence to accurately identify unstructured sensitive data. For example, text derived from a chat between a customer and a customer service agent for a bank may provide useful contextual clues that are helpful in identifying unstructured sensitive data. For example, a street address may have a significant likelihood of occurring in a chat transcript near words that include an occurrence of a phone number. If a phone number is identified in a chat transcript, detection layer #3 202C may use that fact to help identify a nearby occurrence of a street address. Accordingly, contextual information 210 may enable some unstructured information to be accurately identified as sensitive (e.g., a name) or not sensitive (e.g., a generic name of a service or product). Detection layer #3 202C may derive such context from other words in a single line, or from other words in a single sentence or communication by a particular chat participant. In other cases, detection layer #3 202C may derive such context from words used across multiple lines, sentences, paragraphs, responses, or other across multiple chat transcripts.

As illustrated in FIG. 2, detection unit 164 may include additional detection layers, e.g., detection layers 202D-202N, that may employ different types of rule-based parsers, heuristics, machine learning-models, or other algorithms, or any combination therein. The individual detection layers 202 may be applied to text data 200 either concurrently (as shown by the dashed lines arrows from each of detection layers 202 to anonymization unit 168) or sequentially (as shown by the solid line arrows between each of detection layers 202 and ultimately to anonymization 168). In some examples, the individual detection layers 202 may be applied both concurrently and sequentially. As one example, detection layer #1 202A may be applied to text data 200 to detect a first type of sensitive data, and detection layer #2 202B may be applied to one or both of text data 200 and the output of detection layer #1 202A to detect a second type of sensitive data. Applying each of detection layers 202 to text data 200 concurrently may avoid issues with over-scrubbing or loss of context that may degrade the performance of later applied detection layers. On the other hand, applying each of detection layers 202 sequentially may reduce computing power and time. For example, the output of detection layer #1 202A may filter out the first type of sensitive data such that detection layer #2 202B does not use additional computing resources to analyze the same text that has already been detected as sensitive data. In some scenarios, a number or type of the detection layers 202 to apply may be determined based on compute and storage constraints of the computing system supporting masking service 162.

As further illustrated, contextual information 210 may be accessible by each of the detection layers 202 and/or the anonymization unit 168. The contextual information 210 may include customer profile information, raw utterances, and/or a history of transactions by the customer.

In the example of FIG. 2, masking service 162 includes anonymization unit 168 configured to remove, replace, tokenize, scrub, mask, or otherwise obfuscate the sensitive data within text data 200 as detected by each of the detection layers 202. Anonymization unit 168 generates tokenized data 212 by replacing each instance of the sensitive data detected in text data 200 with a respective token. More specifically, anonymization unit 168 includes combining logic 204 to combine the output from each of the detection layers 202 in order to determine all of the detected instances of sensitive data in text data 200 for replacement with tokens. Anonymization unit 168 further includes a data plane 206 configure to generate tokenized data 220 by replacing all the instances of sensitive data detected in text data 200 with tokens and encrypt tokenized data 124 when necessary. Anonymization unit 168 also includes a control plane 208 configured to generate signaling information 224 to ensure faithful recovery of text data 200 from tokenized data 220.

Data plane 206 of anonymization unit 168 is configured to perform tokenization to replace certain types of sensitive data with certain types of tokens, e.g., symbol strings, numerical strings, alphanumeric stings, or generic names. For example, names of people and organizations may be replaced with " " or generic names such as "John" and "Jane." Similarly, account numbers and other numerical fields may be replaced with strings of symbols, e.g., "###," or strings of a single number or consecutive numbers, e.g., "11111" or "12345," having the same number of values or pattern of values as the sensitive data being replaced. Furthermore, phone numbers may be replaced with "PPP-PPP-PPPP," email addresses are replaced with "EEE@EEE," and addresses may be replaced with "AAAAA."

In the specific example shown in FIG. 2, text data 200 input to masking service 162 reads "Transfer $100 to Adam from my account number 21545745," and tokenized data 220 output from masking service 162 reads "Transfer $999 to John from my account number 11223344." In this example, the numerical value of $100 is replaced by a first token $999, the name "Adam" is replaced by a second token "John," and the account number 21545745 is replaced by a third token "11223344."

In some examples, each instance of sensitive data may be replaced by the same string of text (e.g., "XXX"). However, replacing text using different coded strings of text removes or hides a value of the sensitive data included within text data 200, but also leaves or retains an indication of the type of data that was removed (e.g., using the same pattern or capitalization as the sensitive data). An indication of the type of information that was removed may be appropriate for some analytical applications and for other uses.

Control plane 208 of anonymization unit 168 is configured to generate signaling information 224 that defines the tokenization of the sensitive data in text data 200. More specifically, the signaling information 224 identifies, for each token in tokenized data 220, one or more of a location of the token, a type of the token, or an algorithm applied to generate the token for the respective instance of sensitive data within text data 200. An example of signaling information for the specific example shown in FIG. 2 is as follows:

"signaling info": {
 "number of tokens": "9"
 "token positions for masking": "2, 4, 9"
 "token types": "amount, name, account"
 "algorithm": "Fixed/Tokenization/Encryption"
 " . . . ": " . . . "
 " . . . ": " . . . "
 " . . . ": " . . . "
}

Computing system 160 executing masking service 162 may store text data 200 and the signaling information 224 in cache 214 (illustrated as being within anonymization unit 168) or another on-premises cache or other storage location. Computing system 160 may also output tokenized data 220 within a request to cloud-hosted application 106 on cloud platform 105 from FIG. 1. In some examples, the cached or stored text data 200 and associated signaling information 224 may be used to recover at least a portion of the sensitive data from the tokens included in tokenized data 220 and/or any responses from cloud-hosted application 106. For example, backend systems of the organization may have access to the signaling information 224 to extract and process the de-tokenized information (i.e., the sensitive data) as needed.

The techniques described herein may provide certain technical advantages. For example, detection unit 164 comprises a layered architecture with respect to the detection layers 202, which makes masking service 162 modular and flexible. Masking service 162 also provides decoupled detection and tokenization stages. Masking service 162 may access contextual information 210 to assist both the detection layers 202 of detection unit 164 and the tokenization or anonymization logic of anonymization unit 168. Masking service 162 may enable balanced time and space tradeoffs with respect to compute logic 212 and cache 214 or other storage. Masking service 162 also generates signaling information 224 for faithful recover of the original text data 200 from the tokenized data 220. The signaling information 214 may further be used to assist the machine learning-based detection layers, e.g., detection layer #3 202C. For example, the signaling information 224 may provide training data on recurrent features of unstructured sensitive data to help a machine-learning model recognize a proper noun, such as a capitalized first letter having the feature Xxxx.

Figure 3:
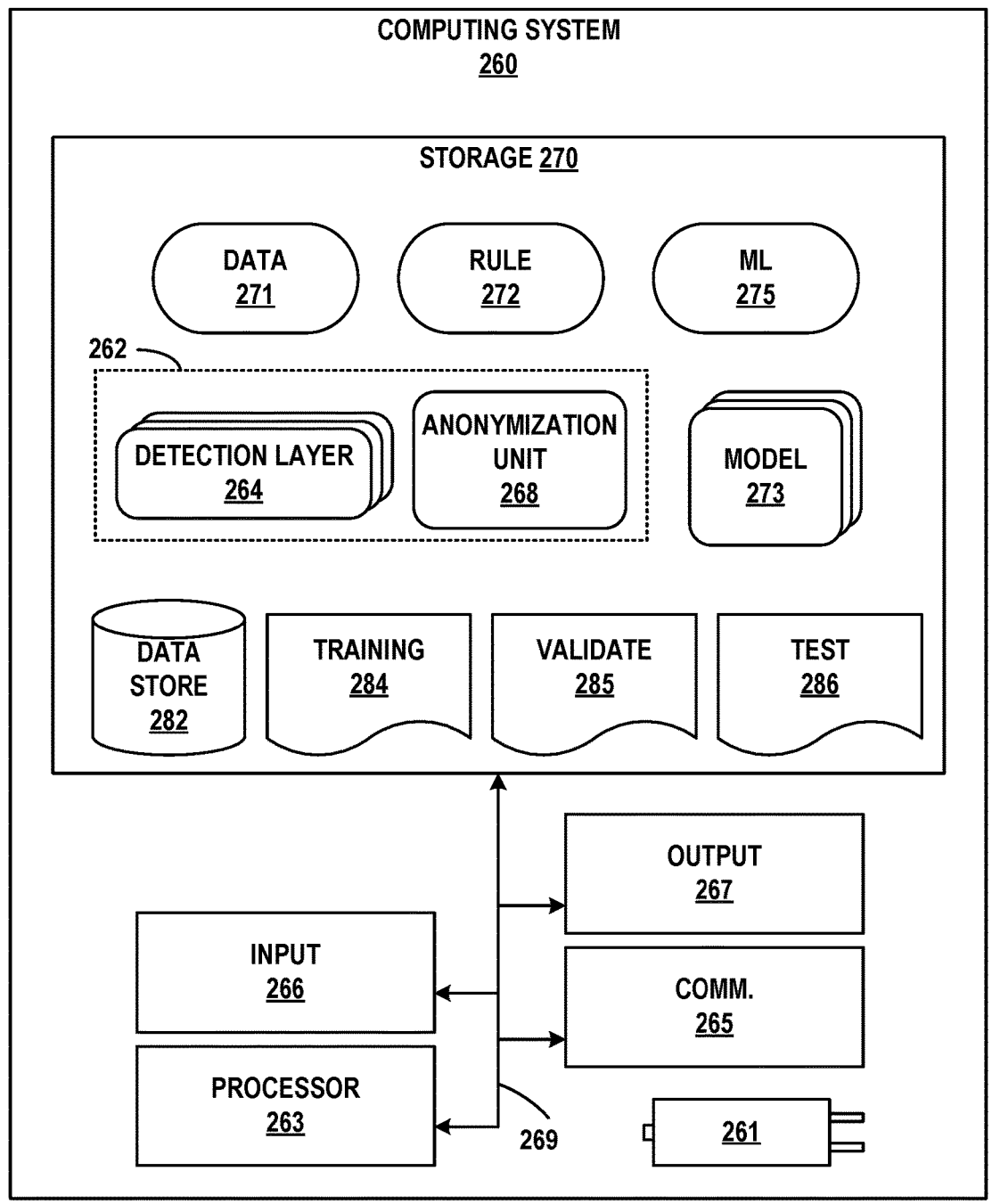
FIG. 3 is a block diagram illustrating an example computing system that supports a masking service configured to detect and anonymize customer personal information in text data, in accordance with one or more aspects of the present disclosure.

FIG. 3 is a block diagram illustrating an example computing system that supports a masking service configured to detect and anonymize customer personal information in text data, in accordance with one or more aspects of the present disclosure. One or more aspects of FIG. 3 may correspond to systems or components described herein within the context of FIG. 1 and/or FIG. 2. For example, computing system 260 may correspond to computing system 160 of FIG. 1, and masking service 262 may correspond to masking service 162 of FIGS. 1 and 2.

In the example of FIG. 3, computing system 260 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 260 represents a cloud computing system, server farm, and/or server cluster (or portion thereof) that provides services to client devices and other devices or systems. In other examples, computing system 260 may represent or be implemented through one or more virtualized compute instances (e.g., virtual machines, containers) of a data center, cloud computing system, server farm, and/or server cluster.

Although illustrated as a single system in FIG. 3, computing system 260 may represent multiple computing systems, and may be implemented in a distributed fashion across multiple data centers and/or geographic regions. Computing system 260 may be implemented by physical or virtualized computing devices, and may use or implement representational state transfer (REST)-based APIs for one or more services described herein.

Computing system 260 may include power source 261, one or more processors 263, one or more communication units 265, one or more input devices 266, one or more output devices 267, and one or more storage devices 270. Storage devices 270 may include data module 271, rule module 272, machine learning (ML) module 275, models 273, as well as detection layers 274 and anonymization unit 268 as masking service 262. Storage devices 270 may further include data store 282, training data 284, validation data 285, and test data 286. One or more of the devices, modules, storage areas, or other components of computing system 260 may be interconnected to enable inter-component communications (physically, communicatively, and/or operatively). In some examples, such connectivity may be provided by through communication channels (e.g., communication channels 269), a system bus, a network connection, an inter-process communication data structure, or any other method for communicating data.

Power source 261 may provide power to one or more components of computing system 260. Power source 261 may receive power from the primary alternating current (AC) power supply in a building, home, or other location. In other examples, power source 261 may be a battery or a device that supplies direct current (DC). In still further examples, computing system 260 and/or power source 261 may receive power from another source. One or more of the devices or components illustrated within computing system 260 may be connected to power source 261, and/or may receive power from power source 261. Power source 261 may have intelligent power management or consumption capabilities, and such features may be controlled, accessed, or adjusted by one or more modules of computing system 260 and/or by one or more processors 263 to intelligently consume, allocate, supply, or otherwise manage power.

One or more processors 263 of computing system 260 may implement functionality and/or execute instructions associated with computing system 260 or associated with one or more modules illustrated herein and/or described below. One or more processors 263 may be, may be part of, and/or may include processing circuitry that performs operations in accordance with one or more aspects of the present disclosure. Examples of processors 263 include microprocessors, application processors, display controllers, auxiliary processors, one or more sensor hubs, and any other hardware configured to function as a processor, a processing unit, or a processing device. Computing system 260 may use one or more processors 263 to perform operations in accordance with one or more aspects of the present disclosure using software, hardware, firmware, or a mixture of hardware, software, and firmware residing in and/or executing at computing system 260.

One or more communication units 265 of computing system 260 may communicate with devices external to computing system 260 by transmitting and/or receiving data, and may operate, in some respects, as both an input device and an output device. In some examples, communication unit 265 may communicate with other devices over a network. In other examples, communication units 265 may send and/or receive radio signals on a radio network such as a cellular radio network. In other examples, communication units 265 of computing system 260 may transmit and/or receive satellite signals on a satellite network such as a Global Positioning System (GPS) network. Examples of communication units 265 include a network interface card (e.g. such as an Ethernet card), an optical transceiver, a radio frequency transceiver, a GPS receiver, or any other type of device that can send and/or receive information. Other examples of communication units 265 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 266 may represent any input devices of computing system 260 not otherwise separately described herein. One or more input devices 266 may generate, receive, and/or process input from any type of device capable of detecting input from a human or machine. For example, one or more input devices 266 may generate, receive, and/or process input in the form of electrical, physical, audio, image, and/or visual input (e.g., peripheral device, keyboard, microphone, camera). For computing devices that may be used by a user, one or more input devices 266 may generate or receive input from a keyboard, pointing device, voice responsive system, video camera, button, sensor, mobile input device, control pad, microphone, presence-sensitive screen, network, or any other type of device for detecting input from a human or machine.

One or more output devices 267 may represent any output devices of computing system 260 not otherwise separately described herein. One or more output devices 267 may generate, receive, and/or process input from any type of device capable of detecting input from a human or machine. For example, one or more output devices 267 may generate, receive, and/or process output in the form of electrical and/or physical output (e.g., peripheral device, actuator). For computing devices that may be used by a user, one or more output devices 267 may generate, present, and/or process output in the form of tactile, audio, visual, video, and other output. Some devices may serve as both input and output devices. For example, a communication device may both send and receive data to and from other systems or devices over a network.

One or more storage devices 270 within computing system 260 may store information for processing during operation of computing system 260. Storage devices 270 may store program instructions and/or data associated with one or more of the modules described in accordance with one or more aspects of this disclosure, e.g., masking service 262. One or more processors 263 and one or more storage devices 270 may provide an operating environment or platform for such modules, which may be implemented as software, but may in some examples include any combination of hardware, firmware, and software. One or more processors 263 may execute instructions and one or more storage devices 270 may store instructions and/or data of one or more modules. The combination of processors 263 and storage devices 270 may retrieve, store, and/or execute the instructions and/or data of one or more applications, modules, or software. Processors 263 and/or storage devices 270 may also be operably coupled to one or more other software and/or hardware components, including, but not limited to, one or more of the components of computing system 260 and/or one or more devices or systems illustrated as being connected to computing system 260.

In some examples, one or more storage devices 270 are temporary memories, meaning that a primary purpose of the one or more storage devices is not long-term storage. Storage devices 270 of computing system 260 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 270, in some examples, also include one or more computer-readable storage media. Storage devices Storage devices 270 may further be configured for long-term storage of information as non-volatile memory space and retain information after activate/off cycles. Examples of non-volatile memories include magnetic and/or spinning platter hard disks, optical discs, Flash memories, or forms of electrically programmable memories (EPROM) or electrically erasable and programmable (EEPROM) memories.

Data module 271 may perform functions relating to receiving data to process for sensitive data or receiving data used for training machine learning models. In some examples, data module 271 may receive textual information in the form of a chat transcript, and prepare such information for processing by one or more other modules included within computing system 260. In other examples, data module 271 may receive data in another form (e.g., an audio recording) and translate the data into a text (e.g., as a text transcript of the audio recording). Data module 271 may process data in preparation for use in training and evaluating machine learning modules, and may store such data within data store 282. In some examples, machine learning module 275 may split data stored within 282 into training data 284, validation data 285, and/or test data 286.

Rules-based parsing module 272 may perform functions relating to applying rule-based algorithms for identifying sensitive data, and may operate and may be implemented as part of one or more detection layers 264 of masking service 262. In some examples, rules-based parsing module 272 may be used primarily or exclusively for identifying structured sensitive data within text, which may include data that has a regular or predictable form, such as phone numbers, account numbers, social security numbers, and other instances of information. In some examples, rules-based parsing module 272 is implemented using a regular expression parser (i.e. a "regex" parser) that uses a sequence of characters to define a search pattern. The search pattern is applied to text to identify sequences of characters that match the search pattern. Although rules-based parsing module 272 is described herein as being implemented using regular expression algorithms, other rule-based algorithms or techniques may be used, and rules-based parsing module 272 should be understood to encompass any rule-based algorithm or technique that applies rules to identify structured information in text.

Machine learning module 275 may perform functions relating to training and/or evaluating models 273 and applying one or more models 273 to generate predicted labels associated with textual elements in a text transcript. Machine learning module 275 may operate and may be implemented as part of one or more detection layers 264 of masking service 262. Machine learning module 275 may further receive information for use in tuning one or more machine learning models, and machine learning module 275 may store such information. Machine learning module 275 may use training data 284 to generate a plurality of models 273, and may use validation data 285 to verify and adjust the skill of each of models 273. Machine learning module 275 may use test data 286 to confirm the skill of each of models 273.

Machine learning module 275 may choose one or more of models 273 for use in a specific one of detection layers 264 to identify sensitive data for a new set of text (e.g., not included within training data 284, validation data 285, and/or test data 286). Machine learning module 275 may receive information that corresponds to a request to identify sensitive unstructured data within a set of text (e.g., text data 122) as part of the specific one of detection layers 264. Machine learning module 275 may apply the chosen one of models 273 to the text, and identify sensitive unstructured data.

Anonymization unit 268 may modify or remove instances of sensitive data detected in text data, e.g., text data 122 of FIG. 1, by rules-based parsing module 272 and/or machine learning model 275 implemented as part of one or more detection layers 264. Anonymization unit 268 may thereby generate tokenized data, e.g., tokenized data 124 of FIG. 1, by replacing each instance of the sensitive data detected in text data 122 with a respective token. In the example where computing system 260 is included in an on-premises pipeline of a cloud-hosted application 106, anonymization unit 268 may further encrypt tokenized data 124 and/or cause communication unit 265 to output tokenized data 124 to application 106 on cloud platform 105.

In some examples, machine learning module 275 may generate models using machine learning algorithms that are based on natural language parsing, and in particular, machine learning module 275 may employ and/or tune a probabilistic parser that makes informed predictions about the structure of messy, unstructured text. Machine learning module 275 may perform this task using Conditional Random Field ("CRF") techniques, which are based on statistical modeling methods sometimes applied in pattern recognition and machine learning and used for structured prediction. CRF techniques fall into the sequence modeling family. Whereas a discrete classifier may predict a label for a single sample without considering "neighboring" samples, a CRF model can take context into account. In some examples, this may be implemented using a linear chain CRF to predict sequences of labels for sequences of text input samples.

Data store 282 may represent any suitable data structure or storage medium for storing data used to train and/or evaluate one or more models 273, or for storing temporary data generated by one or more of models 273. The information stored in data store 282 may be searchable and/or categorized such that one or more modules within computing system 260 may provide an input requesting information from data store 282, and in response to the input, receive information stored within data store 282. In some examples, data store 282 may store a large set of training data, which may include a set of chat transcripts with unstructured sensitive data (and in some cases, structured sensitive data) identified using labels or another method. Data store 282 may be primarily maintained by data module 271. Data store 282 may receive from data module 271 information from one or more data sources, and may provide other modules with access to the data stored within data store 282, and/or may analyze the data stored within data store 282 and output such information on behalf of other modules of computing system 260.

Training data 284 may represent a set of data, derived from data store 282, that is used by machine learning module 275 to train models 273. Validation data 285 represent a set of data, also derived from data store 282, that is used to evaluate and/or validate models 273. Models 273 may be trained with training data 284, and then the results of the training may be validated using validation data 285. Based on training results and/or validation, further adjustments may be made to one or more of models 273, and additional models 273 may be trained and validated using training data 284 and validation data 285, respectively. Test data 286 may be used to verify and/or confirm the results of the training process involving training data 284 and validation data 285.

Modules illustrated in FIG. 3 (e.g., data module 271, rules-based parsing module 272, and machine learning module 275) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
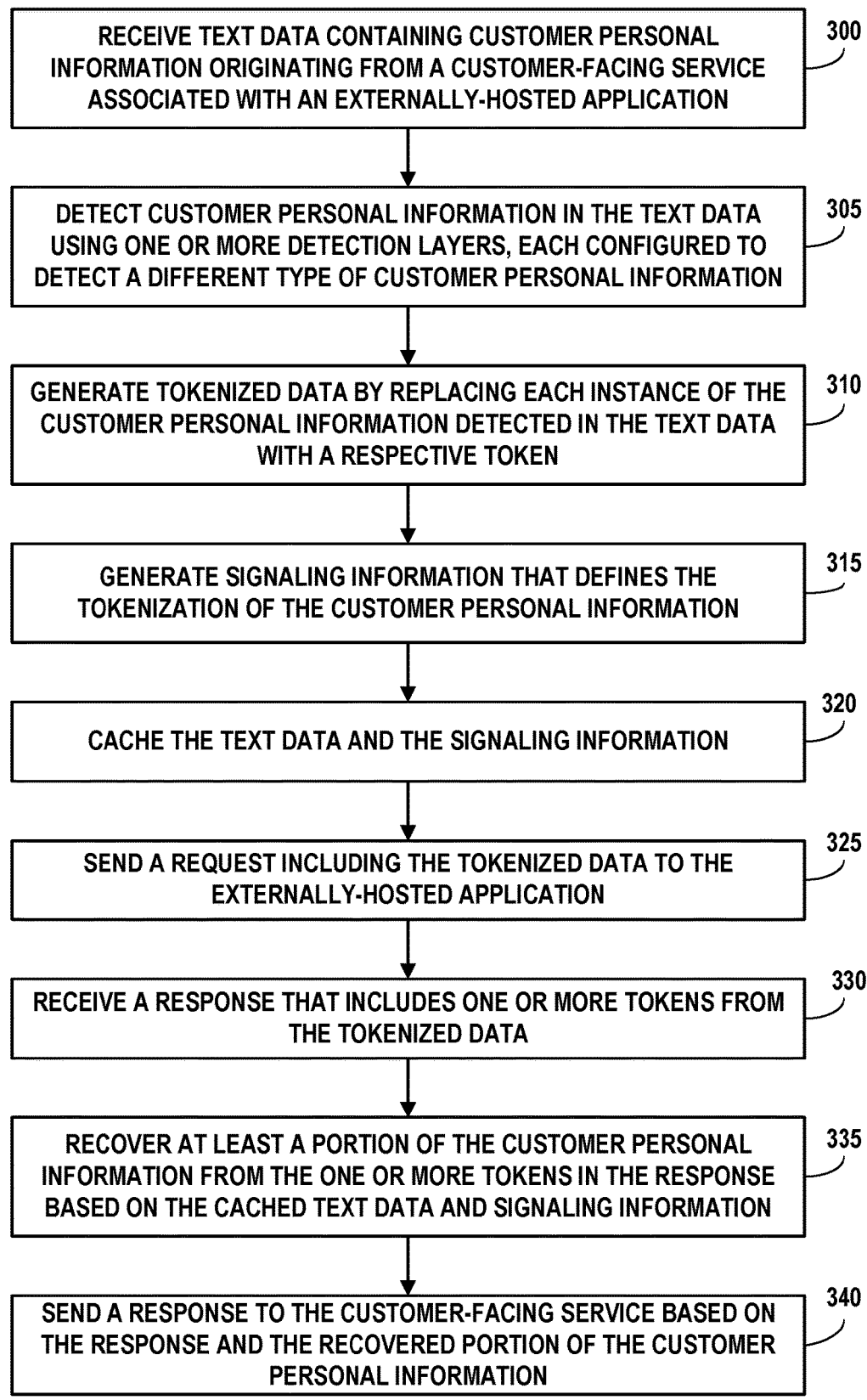
FIG. 4 is a flow chart illustrating an example operation of detecting and anonymizing customer personal information in text data, in accordance with one or more aspects of the present disclosure.

FIG. 4 is a flow chart illustrating an example operation of detecting and anonymizing customer personal information in text data, in accordance with one or more aspects of the present disclosure. The example operation of FIG. 4 is described herein with respect to masking service 162 supported by computing system 160 of FIGS. 1 and 2. In other examples, the operation of FIG. 4 may be performed by other computing systems configured to support masking services, such as computing system 260 and masking service 262 of FIG. 3.

As seen in the example of FIG. 4, masking service 162 of computing system 160 initially may receive text data containing customer personal information, wherein the customer personal information originates from a customer-facing service associated with an externally-hosted application (300). Next, detection unit 164 of masking service 162 may detect the customer personal information in the text data using one or more detection layers, each detection layer configured to detect a different type of customer personal information (305). Next, anonymization unit 168 of masking unit 162 may generate, based on output of the one or more detection layers, tokenized data by replacing each instance of the customer personal information detected in the text data with a respective token (310). In some examples, anonymization unit 168 may also generate signaling information that defines the tokenization of the customer personal information (315). Furthermore, in some examples, anonymization unit 168 may cache the text data and the signaling information (320).

Next, computing system 160 may send a request including the tokenized data to the externally-hosted application (325). In some examples, anonymization unit 168 may encrypt the tokenized data prior to computing system 160 sending the request including the tokenized data to the externally-hosted application. In some examples, computing system 160 then receives a response to the request from the externally-hosted application that includes one or more tokens from the tokenized data (330). In some examples, anonymization unit 168 of masking service 162 may recover at least a portion of the customer personal information from the one or more tokens included in the response based on the cached text data and signaling information (335). Based on the response from the externally-hosted application and the at least partially recovered customer personal information, computing device 160 may send an appropriate response back to the customer-facing service (340).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., computing system 160, computing system 260, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   receiving, by a computing system, text data containing customer personal information, wherein the customer personal information originates from a customer-facing service associated with an externally-hosted application that is external to the computing system;
   detecting, by the computing system, the customer personal information in the text data received from the customer-facing service using multiple detection layers to detect different types of customer personal information having different structures, wherein detecting the customer personal information in the text data comprises:
   detecting, by a first detection layer comprising a rule-based model, a first type of customer personal information that is structured with a deterministic pattern,
   detecting, by a second detection layer comprising a heuristic rule-based model, a second type of customer personal information that is structured with a learned pattern, and detecting, by a third detection layer comprising a machine learning-based model, a third type of customer personal information that is unstructured;

generating, by the computing system, tokenized data based on output of the multiple detection layers, wherein generating the tokenized data comprises replacing each instance of the customer personal information detected in the text data with a respective token; and sending, by the computing system, a request including the tokenized data to the externally-hosted application.

2. The method of claim 1, further comprising generating signaling information that defines the tokenization of the customer personal information.

3. The method of claim 2, wherein the signaling information identifies, for each token in the tokenized data, one or more of a location of the token, a type of the token, or an algorithm applied to generate the token for the respective instance of the customer personal information.

4. The method of claim 2, further comprising:
upon sending the request including the tokenized data, storing the text data and the signaling information in a cache;
receiving a response to the request from the externally-hosted application, wherein the response includes one or more tokens from the tokenized data;
recovering at least a portion of the customer personal information from the one or more tokens included in the response based on the text data and the signaling information stored in the cache; and
based on the response from the externally-hosted application and the recovered portion of the customer personal information, sending a response to the customer-facing service.

5. The method of claim 1, wherein detecting the customer personal information in the text data comprises applying each detection layer to the text data concurrently.

6. The method of claim 1, wherein detecting the customer personal information in the text data comprises:
applying the first detection layer to the text data to detect the first type of customer personal information; and
applying the second detection layer to one or both of the text data or output from the first detection layer to detect the second type of customer personal information, wherein the output of the first detection layer comprises filtered text data in which the first type of customer personal information is filtered out of the text data.

7. The method of claim 1, wherein generating the tokenized data based on the output of the multiple detection layers comprises combining the output of the multiple detection layers to determine all of the detected instances of customer personal information in the text data for replacement with tokens.

8. The method of claim 1, wherein generating the tokenized data comprises one or more of:
replacing the first type of customer personal information that is structured with the deterministic pattern with a first token that hides a value of the first type of customer personal information but retains the deterministic pattern;
replacing the second type of customer personal information that is structured with the learned pattern with a second token that hides a value of the second type of customer personal information but retains the learned pattern; or replacing the third type of customer personal information that is unstructured with a third token having a fixed value that hides a value of the third type of customer personal information.

9. The method of claim 1, further comprising encrypting the tokenized data prior to sending the request including the tokenized data to the externally-hosted application.

10. The method of claim 1, further comprising determining a number of the multiple detection layers to apply based on compute and storage constraints of the computing system.

11. A system comprising:
a customer-facing service associated with an externally-hosted application that is external to the system; and
an application pipeline of the customer-facing service that makes requests to the externally-hosted application on behalf of the customer-facing service, the application pipeline comprising a computing system that includes a memory and processing circuitry in communication with the memory, the processing circuitry configured to:
receive text data containing customer personal information, wherein the customer personal information originates from the customer-facing service;
detect the customer personal information in the text data received from the customer-facing service using multiple detection layers to detect different types of customer personal information having different structures, wherein to detect the customer personal information in the text data, the processing circuitry is configured to:
detect, by a first detection layer comprising a rule-based model, a first type of customer personal information that is structured with a deterministic pattern,
detect, by a second detection layer comprising a heuristic rule-based model, a second type of customer personal information that is structured with a learned pattern, and
detect, by a third detection layer comprising a machine learning-based model, a third type of customer personal information that is unstructured;
generate tokenized data based on output of the multiple detection layers, wherein to generate the tokenized data, the processing circuitry is configured to replace each instance of the customer personal information detected in the text data with a respective token; and
send a request including the tokenized data to the externally-hosted application.

12. The system of claim 11, wherein the processing circuitry of the computing system is configured to generate signaling information that defines the tokenization of the customer personal information.

13. The system of claim 12, wherein the processing circuitry of the computing system is configured to:
upon sending the request including the tokenized data, store the text data and the signaling information in a cache;
receive a response to the request from the externally-hosted application, wherein the response includes one or more tokens from the tokenized data;
recover at least a portion of the customer personal information from the one or more tokens included in the response based on the text data and the signaling information stored in the cache; and
based on the response from the externally-hosted application and the recovered portion of the customer personal information, send a response to the customer-facing service.

14. The system of claim 11, wherein to detect the customer personal information in the text data, the processing circuitry is configured to apply each detection layer to the text data concurrently.

15. The system of claim 11, wherein to detect the customer personal information in the text data, the processing circuitry is configured to:
   apply the first detection layer to the text data to detect the first type of customer personal information; and
   apply the second detection layer to one or both of the text data or output of the first detection layer to detect the second type of customer personal information, wherein the output of the first detection layer comprises filtered text data in which the first type of customer personal information is filtered out of the text data.

16. The system of claim 11, wherein to generate the tokenized data based on the output of the multiple detection layers, the processing circuitry is configured to combine the output of the multiple detection layers to determine all of the detected instances of customer personal information in the text data for replacement with tokens.

17. The system of claim 11, wherein to generate the tokenized data the processing circuitry is configured to one or more of:
   replace the first type of customer personal information that is structured with the deterministic pattern with a first token that hides a value of the first type of customer personal information but retains the deterministic pattern;
   replace the second type of customer personal information that is structured with the learned pattern with a second token that hides a value of the second type of customer personal information but retains the learned pattern; or
   replace the third type of customer personal information that is unstructured with a third token having a fixed value that hides a value of the third type of customer personal information.

18. A non-transitory computer-readable medium storing instructions that, when executed, cause processing circuitry of a computing system to:
   receive text data containing customer personal information, wherein the customer personal information originates from a customer-facing service associated with an externally-hosted application that is external to the computing system;
   detect the customer personal information in the text data received from the customer-facing service using multiple detection layers to detect different types of customer personal information having different structures, wherein to detect the customer personal information in the text data the instructions cause the processing circuitry to:
   detect, by a first detection layer comprising a rule-based model, a first type of customer personal information that is structured with a deterministic pattern,
   detect, by a second detection layer comprising a heuristic rule-based model, a second type of customer personal information that is structured with a learned pattern, and
   detect, by a third detection layer comprising a machine learning-based model, a third type of customer personal information that is unstructured;
   generate tokenized data based on output of the multiple detection layers, wherein to generate the tokenized data, the instructions cause the processing circuitry to replace each instance of the customer personal information detected in the text data with a respective token; and
   send a request including the tokenized data to the externally-hosted application.

* * * * *